United States Patent

[11] 3,615,578

[72] Inventors Adrianus Marie Petrus Hectors;
  Hubertus Johannes Wilhelmus Pecasse,
  both of Venlo, Netherlands
[21] Appl. No. 736,576
[22] Filed June 13, 1968
[45] Patented Oct. 26, 1971
[73] Assignee Van Der Grinten N.V.
  Venlo, Netherlands
[32] Priority June 19, 1967
[33] Netherlands
[31] 6708503

[54] LIGHT-SENSITIVE DIAZO COMPOUNDS AND LIGHT-SENSITIVE MATERIAL CONTAINING THEM
16 Claims, No Drawings
[52] U.S. Cl. .................................................. 96/91,
  96/33, 96/49, 260/141
[51] Int. Cl. ...................................................... G03c 1/52,
  C07c 113/04, C07c 113/00
[50] Field of Search ........................................... 96/49, 75,
  91; 260/141, 142

[56] References Cited
UNITED STATES PATENTS

| | | | |
|---|---|---|---|
| 3,169,869 | 2/1965 | Hendrickx et al. | 96/91 |
| 3,261,684 | 7/1966 | Wilders et al. | 96/49 |
| 3,407,066 | 10/1968 | Mustacchi et al. | 96/91 |
| 3,416,925 | 12/1968 | Sus et al. | 96/91 |
| 3,442,650 | 5/1969 | Hendrickx et al. | 96/91 |
| 3,442,651 | 5/1969 | Hendrickx et al. | 96/91 |
| 3,442,652 | 5/1969 | Hectors et al. | 96/49 X |

OTHER REFERENCES

Landau, R., " Fascicules l a' 8," 1960, p. 51, 94 and 95.
Kosar, J., " Light-Sensitive Systems," 1965, p. 203.

Primary Examiner—Ronald H. Smith
Assistant Examiner—Charles L. Bowers, Jr.
Attorneys—Albert C. Johnston, Robert E. Isner, Lewis H. Eslinger and Alvin Sinderbrand ABSTRACT: Light-sensitive diazo compounds of a new class are prepared by diazotizing aromatic amines of the formula

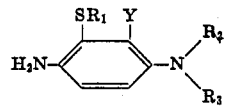

in which $R_1$ is an alkyl, aralkyl or aryl group, Y is a fluorine, chlorine or bromine atom, and

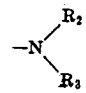

is a tertiary amino group that may be a saturated heterocylic ring. Light-sensitive material (papers, planographic printing plates, etc.) sensitized with salts of these compounds, e.g., with a 4-dialkylamino-3-halo-2-alkylthiobenzene diazonium salt or a 4-dialkylamino-3-halo-2-(4'-methylphenylthio)-benzene diazonium salt, are developable by reaction with aromatic polyvalent phenols to form dark-colored azo dyestuff images having improved water-fastness and background contrast.

LIGHT-SENSITIVE DIAZO COMPOUNDS AND LIGHT-SENSITIVE MATERIAL CONTAINING THEM

This invention relates to a new process for the production of light-sensitive diazo compounds and to new and improved diazo-type materials containing the compounds.

Diazo compounds occupy an important place in applied chemistry. They are used, for instance as light-sensitive substances in the reproduction arts or as intermediates in many chemical syntheses.

The process according to the invention gives a new class of chemical compounds having valuable properties.

The most closely related known compounds are the 4-tert.amino-3-halobenzene diazo compounds, which are used in the diazo-type process for the sensitization of transparent and opaque supports. Examples of such compounds are 4-diazo-2-chloro-N,N-diethylaniline (British Pat. No. 726,755), 4-diazo-2-chloro-N-methyl-N-cyclohexylaniline British Pat. No. 957,838), N-(4-diazo-2-chlorophenyl) morpholine (U.S. Pat. No. 2,541,488), 4-diazo-2-fluoro-N,N-diethylaniline (French Pat. No. 1,398,576). Furthermore in the literature (Fiat Final Report 813, p. 352) 4-diazo-3-ethylthio-N,N-diethylaniline has been mentioned for the sensitization of diazo-type material. This compound is qualified as unfit for use on account of its stained photodecomposition product.

According to the present invention, light-sensitive diazo compounds having new and improved properties and advantageous especially for the production of improved diazo-type materials are prepared by diazotizing aromatic amines of the formula

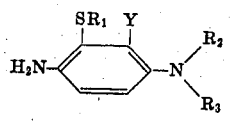

in which $R_1$ is an alkyl group, which may be substituted or nonsubstituted or branched or nonbranched, or an aralkyl or aryl group, Y is a fluorine, chlorine or bromine atom, and

is a tertiary amino group that may be a saturated heterocylic ring linked to the benzene nucleus via a nitrogen atom belonging to the ring. For the sake of brevity, the substituent Y is sometimes referred to hereinafter as a halo- or halogen substituent.

The diazo compounds obtained according to the invention are in many respects quite comparable with the known 4-tert.amino-3-halobenzene diazo compounds. The invention, however, makes it possible to overcome the disadvantages of this known and frequently used group of diazo compounds, to wit, the formation of light-colored and relatively poorly water fast azo dyestuffs upon reaction with aromatic polyvalent phenols. The new diazo compounds in which $R_1$ is an alkyl group having no more than five carbon atoms are, moreover, more light-sensitive, while those in which $R_1$ is an aryl group show greater coupling activity than the known compounds.

The diazo compounds according to the invention can be produced by diazotizing amines of the formula by any of various known diazotizing methods. Such methods have been described, inter alia, in Ullmann's Encyklopadie der technischen Chemie 3 Aufl., 5. Band, pp. 791–794 (1954).

The amino compounds of the formula (1) can be produced from a 2,3,4-trihalonitrobenzene satisfying the formula (2) 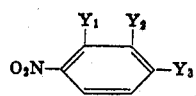

in which each of $Y_1$, $Y_2$ and $Y_3$ is a halogen atom, The 2,3,4-trihalo-1-nitrobenzene is reacted with ammonia, whereby the halogen atom is ortho-position relative to the nitro group is replaced by a primary amino-group. The product thus formed is converted with a tertiary amine 4-ter.amino-3-halo-2-amino-1.-nitrobenzene. Then the primary amino-group of this compound is diazotized and the diazo group replaced by a halogen atom, according to Sandmeyer. This halogen in turn is replaced by an alkylthio, aralkylthio, or arylthio group. The nitro group of the 4-tert.amino-3-halo-2-(alkyl, branched alkyl, arakyl, or aryl) thio-1-nitrobenzene thus produced is reduced, and the amino group thus formed is diazotized.

The 2,3,4-trihalonitrobenzene to be converted into the compounds of the formula (1) in the above way may be, respectively, 2,3,4-trichloro-1-nitrobenzene [prepared according to Rec. trav. chim. 40, 67–69 (1921], 2,3,4-tribromonitrobenzene [prepared according to Atti Accad. Naz. Lincei, Rend. [5/15, II, 583], or 2,3,4-trifluoro-1-nitrobenzene [prepared according to J. Am. Chem. Soc. 8194–99 (1959)].

The compounds of the formula (2) can, if desired, be obtained by starting with 2,3-difluro-1-nitrobenzene [prepared according to J. Am. Chem. Soc. 81 94–99 (1959)]2,3-dichloro-1-nitrobenzene [prepared according to Rec. Trav. Chim. 39, 446–447 (1920)], or 2,3-dibromo-1-nitrobenzene [to be prepared according to Rec. Trav. Chim. 25, 202 (1906), respectively, in the following way: The nitro group of the 2,3-dihalo-1-nitrobenzene is reduced and the amino group thus formed is tosylated; the compound thus obtained is nitrated, the tosylamino group saponified, and the amino group diazotized; and then the diazo group is replaced by a halogen atom according to Sandmeyer. In this way a 4-halo-2,3-di(fluoro, chloro, or bromo)-1-nitrobenzene is obtained. In an analogous way it is possible to produce a trihalogen compound that is suitable as starting material, from a 2,3-dihaloaniline or nitrobenzene in which the halogen atom desired as substituent Y is present in ortho-position relative to the amino group or the nitro group of the formula (1) and another halogen atom is present in meta position.

The compounds of the formula (1) in which the tertiary amino group is a dimethylamino-group can advantageously be produced by a general method other than the one mentioned above. A 2,3-dihaloaniline in which the halogen atom desired as substituent Y is present at least in ortho position relative to the amino-group of formula (1) is tosylated, nitrated, nethylated, and then saponified to 4-methylamino-3-(fluoro,chloro, or bromo)-2-halo-1-nitrobenzene. This product is methylated and reacted with a mercaptan. The resulting nitro compound is reduced and the amino compound is finally diazotized.

The chemical reactions to be applied in the production of the amino compounds of the formula (1), as well as the conditions under which those reactions proceed satisfactorily, are know per se. The mercaptan with which the thio-substituent in ortho position is introduced may be aliphatic, arylaliphatic, or aromatic. Many such mercaptans are known. Their alkyl radical is either straight or branched, and may or may not be substituted; the aryl radical is preferably a phenyl or napththyl radical, which may be further substituted. Examples of suitable mercaptans are methyl, ethyl, propyl, n-butyl, isobutyl, pentyl, and hexylmercaptan, hydroxyethylmercaptan, 2,3-dihydroxypropylmercaptan, 2-(methylamino)ethylmercaptan, 2-carboxymethylmercaptan, phenethylmercaptan, phenyl, o-tolyl, m-tolyl, p-tolyl, p-anisyl, p-hyroxy-phenyl, p-chlorophenyl, p-bromophenyl, p-(2-hydroxyethyl phenyl, p-tertiarybutylphenyl, and 2-carboxyphenylmercaptan. The tertiary amino-group may be cyclic or open chain.

The tertiary amino groups of the compounds of formula(1) may correspond to those of para-tertiary amino diazo compounds known in the literature. The hydrocarbon linked to the tertiary nitrogen atom may carry further substituents. Suitable tertiary amino groups are, for instance, dimethylamino- diethylamino, di-n-propylamino, di-n-butylamino, di-isobutylamino, di-n-hexylamino, N-methyl-N-benzylamino, N-ethyl-N-benzylamino, N-n-propyl-N-benzyl-amino, N-methyl- N-3,4-dichlorobenzylamino, N-methyl-N-cyclohexyl-amino, N-ethyl3N-cyclohexylamino, N-methyl-N-4'-methylcyclohexylamino, N-methyl-N-phenethylamino, N-butyl-N-benzylamino-N-ethyl-N-2-hydroxy-ethylamino, N-propyl-N-2-ethoxyethylamino, N-propyl-N-2-phenoxy-ethylamino, morpholino, piperidino, piperazino, N-acetylpiperazino, N-benzoylpiperazino, N-methylpiperazino, N-2'-hydroxyethyl-piperazino, pyrrolidino, and 2',6'-dimethylmorpholino.

The diazo compounds according to the invention can be used while still present in the liquid in which they have been produced. They are preferably obtained in a known way from this liquid in the form of a dry granular powder. They may be present in the powder as a diazonium salt or in some other form, e.g., as a diazosulphonate, a diazoamine, or a diazosulphone, alone or mixed with other substances, such as acids or salts.

According to the process of the invention the following diazo compounds may, for instance, be obtained:
4-diazo-3-methylthio-2-chloro-N,N-dimethylaniline
4-diazo-3-ethylthio-2-fluoro-N,N-dimethylaniline
4-diazo-3-carboxymethylthio-2-chloro-N,N-dimethylaniline
4-diazo-3-ethylthio-2-bromo-N,N-dimethylaniline
4-diazo-3-ethylthio-2-chloro-N,N-dimethylaniline
4-diazo-3-ethylthio-2-chloro-N,N-dibutylaniline
4-diazo-3-n-propylthio-2-chloro-N,N-dimethylaniline
4-diazo-3-isobutylthio-2-chloro-N,N-dimethylaniline
4-diazo-3(2'-hydroxyethylthio)-2-chloro-N,N-dimethylaniline 4-diazo-3-(2'-ethoxyethylthio)-2-chloro-N,N-dimethylaniline
4-diazo-3-ethlthio-2-chloro-N-methyl-N-cyclohexylaniline
4-diazo-3-ethylthio-2-chloro-N,N-diethylaniline
4-diazo-3-phenethylthio-2-chloro-N,N-dimethylaniline
4-diazo-3-phenylthio-2-chloro-N,N-dimethylaniline
4-diazo-3-(4'-methylphenylthio)-2-fluoro-N,N-dimethylaniline
4-diazo-3-(4'-methylphenylthio)-2-chloro-N,N-dimethylaniline
4-diazo-3-(4'-methylphenylthio)-2-bromo-N,N-dimethylaniline
4-diazo-3-(3'-methylphenylthio)-2-chloro-N,N-dimethylaniline
4-diazo-3-(4'-chlorophenylthio)-2-chloro-N,N-dimethylaniline
4-diazo-3-(4'-tert.butylphenylthio)-2-chloro-N,N-dimethylaniline
4-diazo-3-(3'-methylphenylthio)-2-chloro-N-methyl-N-benzylaniline
4-diazo-3-(3'-methylphenylthio)-2-chloro-N-methyl-N-cyclohexylaniline
4-diazo-3-(2'-methylphenylthio)-2-chloro-N,N-dimethylaniline
4-diazo-3-(4'-hydroxyphenylthio)-2-chloro-N,N-dimethylaniline
4-diazo-3-(4'-methoxyphenylthio)-2-chloro-N,N-dimethylaniline
4-diazo-3-N-/B-naphthylthio-2-chloro-N,N-dimethylaniline
4-diazo-3-(4'-methylphenylthio)-2-chloro-N,N-di-n-pentylaniline
4-diazo-3-(4'-methylphenylthio)-2-chloro-N,N-di-n-hexylaniline
4-diazo-3-(4'-methylphenylthio)-2-chloro-N-methyl-N-isobutyl-aniline
4-diazo-3-(4'-methylphenylthio)-2-chloro-N-n-propyl-N-2'-ethoxy-ethylaniline
4-diazo-3-(4'-methylphenylthio)-2-chloro-N-n-propyl-N-2'-phenoxy-ethylaniline
4-diazo-3-(4'-methylphenylthio)-2-chloro-N-ethyl-N-2'-hydroxy-ethylaniline
4-diazo-3-(4'-methylphenylthio)-2-chloro-N-ethyl-N-2'-chloro-ethylaniline
4-diazo-3-(4'-methylphenylthio)-2-chloro-N-n-propyl-N-benzylaniline
4-diazo-3-(4'-methylphenylthio)-2-chloro-N-n-butyl-N-benzylaniline 4-diazo-3-(4'-methylphenylthio)-2-chloro-N-methyl-N-3''-dichloro-benzylaniline
4-diazo-3-(4'-methylphenylthio)-2-chloro-N-methyl-N-4'-methylcyclo-hexylaniline
4-diazo-3-(4'-methylphenylthio)-2-chloro-N-isobutyl-N-benzylaniline
4-diazo-3-(4'-methylphenylthio)-2-chloro-N,N-diisobutylaniline
4-diazo-3-(4'-methylphenylthio)-2-chloro-N-methyl-N-phenethylaniline
N-(4-diazo-3-(4'-methylphenylthio)-2-chlorophenyl)morpholine
N-(4-diazo-3-(4'-methylphenylthio)-2-chlorophenyl)piperidine
N-(4-diazo-3-(4'-methylphenylthio)-2-chlorophenyl)pyrrolidine
N-(4-diazo-3-(4'-methylphenylthio)-2-chlorophenyl)-N'-acetylpiperazine (1,4).

As a rule the diazo compounds having an open amino group, i.e., those in which $R_2$ stands for an alkyl group, branched or nonbranched, or an aralkyl group and $R_3$ for an alkyl (branched or nonbranched), aralkyl or cycloalkyl group, can be produced in better yields and 20–40 percent more light-sensitive than those in which

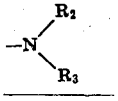

is a saturated heterocyclic ring. The most accessible compounds are those in which

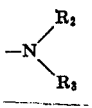

is a dialkylamino, a N-alkyl-N-benzylamino, or a N-alkyl-N-cyclo-hexylamino group, with the alkyl groups having at most four carbon atoms; the benzyl or cyclohexyl group may be nonsubstituted or substituted.

The diazo compounds according to the invention may be used, for instance, as intermediates in chemical syntheses and as light-sensitive substances for the sensitization of supports, such as paper, metal, film, printing plates, etc.

Because the diazo compounds according to the invention have good light-sensitivity, bleach out clearly, and have a suitable coupling activity they are eminently suited in the form of the diazonium salt for the sensitization of diazo-type material.

For the sensitization of two-component diazo-type material 4-diazo-N,N-dialkylanilines have long been used and are still being used on a fairly large scale. Examples of such diazo compounds are 4-diazo-N,N-dimethylaniline, 4-diazo-N,N-diethylaniline, and 4-diazo-N-ethyl-N-2'-hydroxyethylaniline. Material sensitized with these diazo compounds may have a transparent as well as an opaque support. It has good keeping qualities, but its light-sensitivity, as measured by present-day standards, is rather low.

Of recent years highly light-sensitive diazo compounds have come into use for the sensitization of diazo-type materials. These are mainly benzene diazo compounds containing a tert. amino group in p-position and an etherified hydroxyl group in m-position relative to the diazo group, and having, if desired, a substituent such as alkoxy, alkyl, or halogen in para position relative to the etherified hydroxyl group. Among these diazo compounds particularly those in which alkoxy groups are present in positions 2 and 5 have good thermo-stability, in consequence of which diazo-type material sensitized therewith has reasonable resistance to presence in warm surroundings. It is known that heat has an accelerating effect on the decomposition of diazo compounds and that in practice, for instance during transport in summer or storage in the tropics, diazo-type materials are often exposed to temperatures which are considerably higher than room temperature, sometimes even to temperatures of 40° to 50°C.

In two-component diazo-type material, N-(4-diazo-2, 5-diethoxyphenyl)morpholine, inter alia, is used on a very large scale. It is a disadvantage of this compound that its photodecomposition product is toned, so that the whiteness or the transparence of the background areas of copies which have been made from diazo-type paper sensitized with this compound leaves much to be desired.

For the sensitization of diazo-type materials which have to yield copies with a yellow or brown image, 4-diazo-2-chloro-N,N-diethylaniline is frequently used in the one-component diazo-type process. This diazo compound is reasonably light-sensitive, and material sensitized therewith gives with buffered weakly alkaline phloroglucinol developers copies having yellow to pale brown azo dyestuff images, which have high absorption for the ultraviolet copying light commonly used in the diazo-type process. Another compound sometimes used for the sensitization of transparent one-component diazo-type materials is 4-diazo-2-chloro-N-methyl-N-cyclohexylaniline. Material sensitized with this compound, when developed with weakly alkaline phloroglucinol developers, also yields copies having brown azo dyestuff images.

For the sensitization of transparent two-component diazo-type materials, compounds like 4-diazo-2-chloro-N,N-diethylaniline and 4-diazo-2-chloro-N-methyl-N-cyclohexylaniline are not very suitable. Although these compounds bleach out clearly and their light-sensitivity is considerably higher than that of the 4-diazo-N,N-dialkylanilines, the materials obtained therewith yield copies having azo dyestuff images which are lighter and thus visually less contrasting then corresponding two-component diazo-type materials which have been sensitized with the more commonly used compounds, such as 4-diazo-N,N-dimethylaniline or N-(4-diazo-2,5-diethoxyphenyl)morpholine.

One-component diazo-type material which has been sensitized with a diazo compound according to the invention can be developed with the known phloroglucinol-containing liquids to yield copies having azo dyestuff images which are darker and more waterfast than the azo dyestuff images of copies on diazo-type material which has been sensitized with a corresponding compound lacking the thio-substituent.

For use in two-component diazo-type material, the diazo compounds according to the invention provided with the lightest substituents are especially suitable. They are particularly attractive for use in transparent two-component diazo-type materials destined for making intermediate copies for further reproduction on diazo-type material.

For the sensitization of printing plates, too, diazo compounds are often used. For this use mainly three categories are to be distinguished, to wit: the oleophilic esters and amides of aromatic ortho-quinone diazides; the tanning diazo compounds, specifically condensation products of benzene diazo compounds with aldehydes, and the diazonium salts, which in combination with suitable azo-components (such as phloroglucinol) form oleophilic azo dyestuffs and also have a hydrophilic photodecomposition product.

The last-mentioned category of diazo compounds is also suitable for the sensitization of conventional diazo-type material. Thus from the Dutch Pat. applications Nos. 64.11713, 64.06149, and 295,561 diazo compounds are known which are eminently suited for the sensitization of diazo-type material as well as for the sensitization of hydrophilic planographic surfaces which are converted into a printing form by imagewise exposure and development with a liquid containing an azo-component. The planographic plates sensitized with diazo compounds, in which the formation of the image is effected by means of a diazo-type process, are referred to below as diazo-type planographic plates.

The diazo-type planographic plates are obtained by sensitizing a support, such as paper, aluminum or plastic foil, which has a so-called planographic surface, with a solution of a diazo compound. By a planographic surface is to be understood a hydrophilic surface having only small water-absorption. Supports with a planographic surface are commonly known and regularly used in the planographic and offset techniques. The paper supports consist of wet-strength paper (if desired, also provided with one or more water-resistant layers) and a planographic layer in which a hydrophilic filler (such as silica, titanium dioxide, or barium sulphate) and a hydrophilic organic binder that is insoluble or has been made insoluble in water (such as gelatin, casein, zein, starch derivatives, hydroxyethylcellulose, or polyvinyl alcohol) are present. The plastic supports, e.g., cellulose ester or polyester film, are provided with a planographic surface, e.g., by saponification or by providing the surface with a planographic layer, such as a layer of the composition described above in connection with the paper supports. In order that such layers may be fixed on a plastic film, the surface of the film may have undergone in a known way a treatment for making it more susceptible to coatings of this kind, or it is provided with one or more so-called adhesive layers. The aluminum supports have as surface to be sensitized, for instance, an aluminum oxide skin (preferably a bohmite skin), a silicate coating, or a planographic filler-binder coating of the above-mentioned type.

Many of the diazo compounds according to the invention can be used advantageously for the sensitization of planographic plates for the diazo-type process. Compounds according to the invention which are particularly suitable for the sensitization of such lithographic surfaces are those in which $R_1$ is a phenyl group which may be substituted or nonsubstituted. They give plainly visible and sharp azo dyestuff images which absorb ink readily and selectively when in the developing liquid an actively coupling aromatic hydroxyl compound forming oleophilic azo dyestuffs, such as phloroglucinol, resorcinol, or 2,3-dihydroxynaphthalene, is incorporated.

The following examples further illustrate the practice and advantages of the invention.

EXAMPLE I

In an autoclave 2,3,4-trichloro-1-nitrobenzene is converted by reaction with ammonia at 140° C. into 3,4-dichloro-2-amino-1-nitrobenzene (melting point 162° C). This compound is boiled with N-methyl-N-cyclohexylamine to form 4-N-methyl-N-cyclohexylamino-3-chloro-2-amino-1-nitrobenzene (melting point 77°–78° C.), which is diazotized with nitrosyl sulphuric acid in glacial acetic acid at a temperature of 15°–20° C., after which cuprous chloride and hydrochloric acid are added to the reaction mixture. After neutralization, the 4-N-methyl-N-cyclohexylamino-2,3-dichloro-1-nitrobenzene is extracted with ether and obtained by evaporation of the ether.

After purification, the product thus obtained is dissolved in ethanol, along with ethylmercaptan and potassium hydroxide, and boiled. The reaction mixture is poured out on ice and the 4-N-methyl-N-cyclohexylamino-3-chloro-2-ethylthio-1-nitrobenzene is obtained by extraction with ether and evaporation of the ether from the extract.

The nitro compound is dissolved in glacial acetic acid and reduced with zinc powder. The reaction mixture is neutralized. The amino compound is extracted with ether, and after evaporation of the ether the residue is dissolved in a mixture of glacial acetic acid and hydrochloric acid. At about 5° C. an aqueous solution of sodium nitrite is added dropwise to this solution to obtain the diazo compound which is brought to the form of the chlorozincate.

In an acid aqueous solution the 4-N-methyl-N-cyclohexylamino-3-chloro-2-ethylthiobenzene diazonium chlorozincate thus produced shows maximum absorption at 4120A., with $E_{max}$=29,000. The compound is very suitable for the sensitization of diazo-type material.

EXAMPLE II

4-Tosylamino-2,3-dichloro-1-nitrobenzene (melting point 147° C.), obtained by tosylating 2,3-dichloro-aniline in the known way and nitrating the tosylamino compound in glacial acetic acid with the theoretically required quantity of nitric acid, is dissolved in a mixture of ethyleneglycolmonomethyl ether and water, and then methylated with dimethyl sulphate.

The 4-N-methyl-N-tosylamino-2,3-dichloro-1-nitrobenzene thus obtained (melting point 138°–140° C.) is converted with a mixture of 90 parts be weight of sulphuric acid and 10 parts by weight of water at 50°–60° C. into 4-methylamino-2,3-dichloro-1-nitrobenzene (melting point 162°–163° C.). This product is methylated by boiling with a mixture of formaldehyde, formic acid, and acetic anhydride to form 4-dimethylamino-2, 3-dichloro-1-nitrobenzene (melting point 80° C.). This compound is dissolved along with ethylmercaptan and potassium hydroxide in ethanol and boiled. The 4-dimethylamino-3-chloro-2-ethylthio-1-nitrobenzene thus obtained (melting point 37°–38° C.) is catalytically reduced in ethyl acetate.

The resulting 4-dimethylamino-3-chloro-2-ethylthioaniline is diazotized at 0°–5° C. in dilute hydrochloric acid with sodium nitrite, and the diazo compound obtained is brought to the form of the chlorozincate.

EXAMPLE III

The nitro-group in 3-chloro-2-fluoro-1-nitrobenzene is reduced with stannous chloride and hydrochloric acid to form the amino compound which is tosylated in the known way. The tosylamino compound is nitrated with nitric acid to form 4-p-tosylamino-3-fluoro-2-chloro-1-nitrobenzene (melting point 129°–130° C.). This compound is methylated with dimethyl sulphate, and then the tosylamino group is saponified with sulphuric acid. The monomethylamino compound (melting point 143° C.) is methylated with p-formaldehyde, formic acid, and acetic anhydride. The 4-dimethyl-amino-3-fluoro-2-chloro-1-nitrobenzene thus obtained (melting point 102° C.) is converted with p-tolylmercaptan and potassium hydroxide into 4-dimethylamino-3-fluoro-2-(4'-methylphenylthio)-1-nitrobenzene (melting point 95° C.). This nitro compound is reduced with zinc dust and acetic acid, after which the amine thus obtained is diazotized, and the diazo compound obtained is brought to the form of the chlorozincate.

EXAMPLE IV 2,3-dichloro-1-nitrobenzene is converted in an autoclave by reaction with ammonia, into 3-chloro-2-amino-1-nitrobenzene (melting point 75° C.). This product is diazotized and converted with cuprous bromide according to Sandmeyer into 3-chloro-2-bromo-1-nitrobenzene. Analogously to the method described in Example III, from this compound the 4-dimethylamino-3-bromo-2-(4'-methylphenylthio)-1-nitrobenzene (melting point 212° C.) is produced, from which the diazo compound is obtained, by reduction and diazotization, in the form of the chlorozincate.

EXAMPLE V

The diazo compound 4-dimethylamino-3-chloro-2-ethylthiobenzene diazonium chloride, zinc chloride double salt, produced according to Example II, is converted in the following ways into the diazosulphonate, the diazosulphone and the diazoamine, respectively:

a. Diazosulphonate 103.5 g. of the said diazo compound is dissolved in 150 ml. of 5 N hydrochloric acid and as much water as is required to obtain a clear solution. After cooling to 0° C., a solution of
37.8 g. of sodium sulphite and
51.3 g. of sodium carbonate in
450 ml. of water is added dropwise with stirring to the solution. When this solution has been completely added, the mixture is stirred for another 10 minutes. The diazosulphonate is subsequently precipitated with the aid of sodium chloride. The precipitate is sucked off and recrystallized from ethanol (96 percent). In an aqueous solution the diazosulphonate thus obtained has an absorption maximum with an E-value of 8750 at 3630A.

b. Diazosulphone 43 g. of the said diazo compound is dissolved in 35 ml. of hydrochloric acid (s.g. 1.19) and as much water as is required to obtain a clear solution. The solution is cooled to 0° C., and then a solution of
41 g. of the sodium salt of p-toluenesulphinic acid, and
25 g. of soda in
500 ml. of water is added. After the addition the mixture is stirred for another 20 minutes and then the precipitate is sucked off. The product thus obtained, dissolved in chloroform, has an absorption maximum with an E-value of 16,600 at 4260A.

c. Diazoamine 170 g. of the said diazo compound is dissolved in 380 ml. of hydrochloric acid (1.2 N) and as much water as is required to obtain a clear solution. The solution is cooled at 10° C. Then a solution of
50 g. of sarcosine and
120 g. of sodium bicarbonate in
1250 ml. of water is added dropwise with stirring. After this, the stirring is continued for another 15 minutes. Then 150 g. of sodium carbonate is added, and the diazoamine is precipitated with sodium chloride. After half an hour's stirring, the oily substance is decanted and dissolved in chloroform. The solution thus obtained is made anhydrous after which the diazoamine is precipitated with petroleum ether. The precipitate is washed with petroleum ether and dried in a desiccator. An aqueous solution of the diazoamine buffered to pH 9 with borax has an absorption maximum with an E-value of 13,560 at 2720A, and with an E-value of 14,300 at 3180A.

EXAMPLE VI

A mother liquor is produced, which contains 30 g. of tartaric acid
20 g. of the sodium salt of naphtalene 1,3,6-trisulphonic acid
40 g. of 2.4-dihydroxybenzoic acid /B-hydroxy-ethylamide
20 g. of sulphosalicylic acid
300 ml. of ethanol (96 percent) and
700 ml. of water.
Of this liquid, 3 portions of 300 ml. each are taken.

A. To the first portion is added
25 g. of 4-dimethylamino-3-chloro-2-ethylthio-benzene diazonium chloride, zinc chloride double salt.

B. To the second portion is added
27 g. of 4-morpholino-2,5-diethoxybenzene diazonium chloride, zinc chloride double salt.

C. To the third portion is added
20 g. of 4-dimethylamino-3-methoxybenzene diazonium chloride, zinc chloride double salt.

With each of the sensitizing liquids sized natural tracing paper of 80 g./m.² is sensitized. After drying, of each of the three diazo-type materials a first sheet is imagewise exposed under a transparent ink drawing until underneath the transparent portions of the drawing all the diazo compound has bleached out. The copies are developed in ammonia vapor. They show a brown image. Their background is transparent, but the background of the copy on sheet A is markedly clearer than that of the copies on sheets B and C, and has greater transmission for the copying radiation commonly used in the diazo-type process. Furthermore, the image of the copy on sheet B has much lower density for this radiation than the image on the other copies.

A second sheet of each of the three light-sensitive materials is stored for 48 hours in a space in which a temperature of 50° C. prevails and the humidity is 4½percent. The sheets are then developed in ammonia vapor. On sheet C after development practically no azo dyestuff is present, while on sheets A and B a large quantity of azo dyestuff is clearly present.

EXAMPLE VII

A cellulose acetate butyrate layer provided on a polyethylene terephthalate film is sensitized with a solution which contains 26 g. of 4-dimethylamino-3-chloro-2-isobutylthiobenzene diazonium chloride, zinc chloride double salt
50 g. of citric acid
30 g. of sulphosalicylic acid
30 g. of 3-(2'-hydroxyethoxy)phenol
50 ml. of glacial acetic acid and
950 ml. of methylglycol, and dried.

A sheet of the light-sensitive polyester material thus obtained is imagewise exposed underneath a pencil drawing on tracing paper until underneath the transparent portions of the drawing the diazo compound has largely bleached out. The copy shows a brown image on a foggy pale brown background. The copy is eminently suited for further copying on diazo-type material.

EXAMPLE VIII

White base paper of 80 g./m.² for the diazo-type process is sensitized with a solution containing
16.8 g. of 4-dimethylamino-3-chloro-2-(2'-hydroxyethylthio)-benzene diazonium chloride, stannic chloride double salt
40 g. of tartaric acid
10 g. of thiourea
12.5 g. of 8-hydroxy [1,2d]-naphthimidazole
10 ml. of hydrochloric acid (s.g. 1.19)
30 ml. of isopropanol
20 g. of caffein and
10 g. of N,N'-dimethylurea in 1000 ml. of water, and dried.

A sheet of the light-sensitive diazo-type paper thus obtained is imagewise exposed and developed as described in Example VI. The copy shows a violet image on a clear white background.

EXAMPLE IX

White base paper of 80 g./m.² for the diazo-type process is sensitized with a liquid containing
30 g. of 4-N-methyl-N-benzylamino-3-chloro-2-ethylthiobenzene diazonium chloride, stannic chloride double salt
5 g. of tartaric acid and
30 ml. of an aqueous polyvinyl acetate dispersion having a content of solid matter of 50 percent and an average particle size of 1-3 microns, in
100 ml. of water, and dried.

A sheet of the diazo-type paper thus obtained is imagewise exposed underneath a pencil drawing on tracing paper until underneath the transparent portions of the drawing substantially all the diazo compound has bleached out, and is then developed with the following developer:
6.5 g. of phloroglucinol
4 g. of resorcinol
10 g. of thiourea
2 g. of the sodium salt of dibutylnaphthalene sulphonic acid
14 g. of sodium formate
22 g. of sodium benzoate
49 g. of trisodium citrate (2 aq.) and
1.2 g. of citric acid in 1000 ml. of water. The pH of this liquid is about 6.5.

The copy shows a dark image on a foggy background.

If in the above sensitizing liquid instead of the said diazo compound an equivalent quantity of the diazo compound produced according to example III is used, a copy with a black image on a foggy grey background is obtained. If in the above sensitizing liquid and the said diazo compound is replaced by the compound produced according to example IV, copies with a black image on a foggy grey background are also obtained.

EXAMPLE X

A. A sheet of white base paper of 80 g./m.² for the diazo-type process is sensitized with a liquid containing
24 g. of 4-N-methyl-N-cyclohexylamino-3-chloro-2-ethylthio-benzene diazonium chloride, zinc chloride double salt
5 g. of tartaric acid and
30 ml. of polyvinyl acetate dispersion in
1000 ml. of water, and dried.

B. A sheet of white base paper of 80 g./m.² for the diazotype process is sensitized with a liquid containing
20 g. of 4-N-methyl-N-cyclohexylamino-3-chlorobenzene diazonium chloride, zinc chloride double salt
5 g. of tartaric acid and
30 ml. of polyvinyl acetate dispersion in
1000 ml. of water, and dried.

Strips of sheets A and B are exposed underneath a transparent ink drawing until underneath the transparent portions of the drawing all the diazo compound has bleached out. It then appears that strip A is markedly more light-sensitive than strip B. The strips are developed with the following developer:
30 g. of thiourea
5.4 g. of phloroglucinol
6.5 g. of resorcinol
1 g. of potassium salt of hydrquinone monosulphonic acid
5 g. of sorbitol
15 g. of beet sugar
50 g. of potassium tetraborate (5 aq.) and
1.5 g. of the sodium salt of isopropylnaphthalene sulphonic acid in 1000 ml. of water. The pH of this liquid is about 9.

The strip A shows a darker azo dyestuff image than strip B. The water-Fastness of the azo dyestuff is markedly greater in sheet A than in sheet B. If the strips of the sheets A and B are developed, after imagewise exposure, with the developer described in Example IX, a strip A shows a violet-black, Strip B a dark brown azo dyestuff image. The azo dyestuff image on strip A is sharper because the azo dyestuff bleeds less upon development than in the case of strip B.

EXAMPLE XI

A paper planographic plate of the "Rotaprint" C3-type is sensitized with a solution of
24 g. of 4-dimethylamino-3-chloro-2-(4'-methylphenylthiobenzene diazonium chloride, zinc chloride double salt in
200 ml. of ethanol (96 percent) and 800 ml. of water, and dried.

The light-sensitive planographic plate thus obtained is imagewise exposed underneath a positive original until underneath the transparent portions thereof all the diazo compound has bleached out, and is then developed with a solution containing
12 g. of phloroglucinol
87 g. of disodium hydrogen phosphate (2 aq.) and
11 g. of citric acid
in 1000 ml. of water, and sponged off with water; it shows a brown image on a white background. The image absorbs printing ink in a satisfactorily selective way. On an offset printer 150 good prints are made of the plate.

In the above sensitizing liquid the diazo compound used can be replaced by the diazonium salt obtained from any of the following amines:
a. 4-dimethylamino-3-chloro-2-(4'-methoxyphenylthio)aniline
b. 4-dimethylamino-3-chloro-2-(2'-methylphenylthio)aniline
c. 4-dimethylamino-3-bromo-2-(4'-methylphenylthio)aniline
d. 4-N-methyl-N-benzylamino-3-chloro-2-(4'-methylphenylthio)aniline
3. 4-N-methyl-N-cyclohexylamino-3-chloro-2-ethylthioaniline. The plate obtained with compound e gives approximately 50 good prints. With the other plates at least 100-200 good prints can be made.

EXAMPLE XII

White base paper of 80 g./m.² for the diazo-type process is sensitized with a solution containing
2 g. of the diazosulphonate produced according to example V
0.4 g. of sodium sulphite
0.8 g. of phloroglucinol
3 g. of thiourea and 2 g. of boric acid in 100 ml. of water, and dried.

A sheet of the diazo-type paper thus obtained is imagewise exposed until underneath the transparent portions of the original all the diazo compound has bleached out and is then developed by heating. The copy thus obtained shows a brown image on a white background.

EXAMPLE XIII

Tracing paper is coated with a solution containing 20 g. of the diazosulphone produced according to example V 10 g. of resorcinol 10 g. of polyvinyl acetate and 20 g. of oxalic acid in 1000 ml. of acetone, and dried.

By imagewise exposure and development as described in example XII a copy having a yellow-brown azo dyestuff image on a transparent background is obtained.

EXAMPLE XIV

In 1 liter of water there is dissolved about 30 g. of the diazoamine produced according to example V. 10 ml. of hydrochloric acid (s.g. 1.19), 5 g. of citric acid, and 30 ml. of polyvinyl acetate dispersion are added. With the sensitizing liquid thus produced, white base paper of 80 g./m.² for the diazo-type process is sensitized. After the sensitization the paper is dried.

A copy is made with the paper in the way described in example IX.

1. A light-sensitive diazo compound of the formula

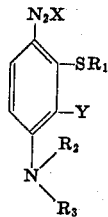

in which $N_2X$ is a diazo group and X is an anion of an acidic compound; $R_1$ is an alkyl group having up to six carbon atoms, a phenyl or naphthyl group, or a phenylalkyl group having up to two carbon atoms in the alkyl part thereof;

Y is a chlorine, fluorine or bromine atom;

$R_2$ is an alkyl group having up to six carbon atoms, a phenylalkyl group having up to two carbon atoms in the alkyl part thereof, or a benzyl group or a cycloalkyl group having five or six carbon atoms; and $R_3$ is an alkyl group having up to six carbon atoms; or $R_2$ and $R_3$ together with the nitrogen atom to which they attach form a saturated 5- or 6-membered heterocyclic ring.

2. A diazo compound according to claim 1, wherein $R_1$ is an alkyl group having at most five carbon atoms.

3. A diazo compound according to claim 1, wherein $R_1$ is a phenyl group.

4. A diazo compound according to claim 1, wherein $R_3$ is an alkyl group having at most four carbon atoms and $R_2$ is an alkyl group having at most four carbon atoms or a benzyl or cyclohexyl group.

5. A diazo compound according to claim 1, that is, a 4-dimethylamino-3-(chloro, fluoro or bromo)-2-methylthiobenzene diazonium salt.

6. A diazo compound according to claim 1, that is, a 4-(methyl) (cyclohexyl)amino-3-(chloro, fluoro or bromo)-2-methylthiobenzene diazonium salt.

7. A diazo compound according to claim 1, that is, a 4-dimethylamino-3-(chloro, fluoro or bromo)-2-(4'-methylphenylthio) benzene diazonium salt.

8. A light-sensitive diazo compound of the formula

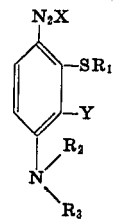

in which $N_2X$ is a diazo group and X is an anion of an acidic compound;

$R_1$ is an alkyl group having up to six carbon atoms or a phenyl, naphthyl or phenethyl group;

$R_2$ is an alkyl group having up to six carbon atoms or a phenethyl, benzyl or cyclohexyl group; and $R_3$ is an alkyl group having up to six carbon atoms;

or $R_2$ and $R_3$ together with the nitrogen atom to which they attach form a saturated 5- or 6-membered heterocyclic ring.

9. Light-sensitive material comprising a support carrying thereon a light-sensitive layer containing a light-sensitive diazo compound according to claim 8.

10. Light-sensitive material, comprising a support carrying thereon a light-sensitive layer containing a light-sensitive diazo compound of the formula

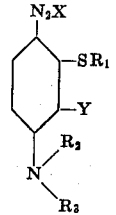

in which $N_2X$ is a diazo group and X is an anion of an acidic compound;

$R_1$ is an alkyl group having up to six carbon atoms, a phenyl or naphthyl group, or a phenylalkyl group having up to two carbon atoms in the alkyl part thereof;

Y is a chlorine, fluorine or bromine atom;

$R_2$ is an alkyl group having up to six carbon atoms, a phenylalkyl group having up to two carbon atoms in the alkyl part thereof, or a benzyl group or a cycloalkyl group having five or six carbon atoms and $R_3$ is an alkyl group having up to six carbon atoms;

or $R_2$ and $R_3$ together with the nitrogen atom to which they attach form a saturated 5- or 6-membered heterocyclic ring.

11. Light-sensitive material according to claim 10, wherein $R_1$ is an alkyl group having at most five carbon atoms.

12. Light-sensitive material according to claim 10, suitable for use as a diazo-type planographic plate and wherein $R_1$ is a phenyl group.

13. Light-sensitive material according to claim 10, wherein $R_3$ is an alkyl group having at most four carbon atoms and $R_2$ is an alkyl group having at most four carbon atoms or a benzyl or cyclohexyl group.

14. Light-sensitive material according to claim 10, wherein said compound is a 4-dimethylamino-3-(chloro, fluoro or bromo)-2-methylthiobenzene diazonium salt.

15. Light-sensitive material according to claim 10, wherein said compound is a 4-dimethylamino-3-(chloro, fluoro or bromo)-2-(4'-methylthio) benzene diazonium salt.

16. Light-sensitive material according to claim 10, wherein said compound is a 4-methylamino-3-(chloro, fluoro or bromo)-2(4'methyphenylthio) benzene diazonium salt.

* * * * *

UNITED STATES PATENT OFFICE

CERTIFICATE OF CORRECTION

Patent No. 3,615,578  Dated October 26, 1971

Adrianus Marie Petrus Hectors
and
Hubertus Johannes Wilhelmus Pecasse

Assignors to Van Der Grinten N.V.,
of Venlo, Netherlands.

It is certified that error appears in the above identified patent and that said Letters Patent are hereby corrected as shown below:

Col. 3, Line 30, "ethlthio" should read "ethylthio".

Col. 4, Line 1, -- 3" -- should read -- 3',4' -- .

Col. 5, Line 29, "then" should read "than".

Col. 7, Line 3, "be" should read "by".

Col. 10, Line 19, "hydrquinone" should read "hydroquinone"; Line 63, "3." should read "e.".

Signed and sealed this 9th day of May 1972.

(SEAL)
Attest:

EDWARD M. FLETCHER, JR.
Attesting Officer

ROBERT GOTTSCHALK
Commissioner of Patents

UNITED STATES PATENT OFFICE

CERTIFICATE OF CORRECTION

Patent No. 3,615,578            Dated October 26, 1971

Adrianus Marie Petrus Hectors
and
Hubertus Johannes Wilhelmus Pecasse

Assignors to Van Der Grinten N.V.,
of Venlo, Netherlands.

It is certified that error appears in the above-identified patent and that said Letters Patent are hereby corrected as shown below:

Col. 2, line 63, insert and read "1-carboxyethylmercaptan," before "phenethylmercaptan".

Col. 3, line 2, "3 N" should read "-N".

Claim 15, line 2, "dimethylamino" should read -- (methyl)(cyclohexyl) amino -- and line 3, "(4'-methylthio)" should read -- methylthio -- .

Claim 16, line 2, "methylamino" should read -- dimethylamino -- .

Signed and sealed this 15th day of May 1973.

(SEAL)
Attest:

EDWARD M. FLETCHER, JR.           ROBERT GOTTSCHALK
Attesting Officer                   Commissioner of Patents